(12) United States Patent
Salter et al.

(10) Patent No.: US 12,049,210 B2
(45) Date of Patent: Jul. 30, 2024

(54) SYSTEMS AND METHODS FOR PROVIDING TOWING BRAKING ASSISTANCE DURING IN-FLIGHT CHARGING OF ELECTRIFIED VEHICLES

(71) Applicant: FORD GLOBAL TECHNOLOGIES, LLC, Dearborn, MI (US)

(72) Inventors: Stuart C. Salter, White Lake, MI (US); Peter Phung, Windsor (CA); Kenneth Patrick McHugh, Canton, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 469 days.

(21) Appl. No.: 17/337,667

(22) Filed: Jun. 3, 2021

(65) Prior Publication Data
US 2022/0388484 A1    Dec. 8, 2022

(51) Int. Cl.
*B60T 7/04* (2006.01)
*B60D 1/24* (2006.01)
*B60D 1/62* (2006.01)
*B60L 7/10* (2006.01)
*B60L 53/18* (2019.01)
*B60T 7/20* (2006.01)
(Continued)

(52) U.S. Cl.
CPC .............. *B60T 7/042* (2013.01); *B60D 1/242* (2013.01); *B60D 1/62* (2013.01); *B60L 7/10* (2013.01); *B60L 53/18* (2019.02); *B60T 7/20* (2013.01); *B60T 8/1708* (2013.01); *B60T 17/22* (2013.01); *B60T 17/223* (2013.01); *B60L 2200/28* (2013.01); *B60L 2250/26* (2013.01); *B60T 2201/03* (2013.01)

(58) Field of Classification Search
None
See application file for complete search history.

(56) References Cited

U.S. PATENT DOCUMENTS 4,199,037 A * 4/1980 White ...................... B60K 3/04
                                                180/65.245
5,503,468 A * 4/1996 Saffran .................. B60T 13/66
                                                    303/7

(Continued)

FOREIGN PATENT DOCUMENTS

CA        3121467 A1 *  7/2020  .............. B60L 15/20
CN     104321946 A  *  1/2015  ............... B60D 1/64

(Continued)

Primary Examiner — Kevin R Steckbauer
(74) Attorney, Agent, or Firm — David B. Kelley; Carlson, Gaskey & Olds, P.C.

(57) ABSTRACT

Systems and methods for coordinating and providing braking assistance between towing vehicles and towed vehicles during towing events, such as bidirectional charging towing events, are provided. The towing braking assistance may be provided by the towed vehicle in the form of an assistive braking torque output to assist the towing vehicle with meeting a target deceleration rate during the towing event. The assistive braking torque output may be provided to account for mutual vehicle deceleration events, brake compensation or brake fade events, and stability events of the coupled vehicles during the towing events, for example.

11 Claims, 7 Drawing Sheets

(51) Int. Cl.
    *B60T 8/17*    (2006.01)
    *B60T 17/22*    (2006.01)

(56) References Cited

U.S. PATENT DOCUMENTS

| | | | | |
|---|---|---|---|---|
| 6,516,925 | B1* | 2/2003 | Napier | B60T 8/1708 |
| | | | | 188/112 A |
| 6,609,766 | B1* | 8/2003 | Chesnut | B60T 11/107 |
| | | | | 188/3 R |
| 6,845,851 | B1* | 1/2005 | Donaldson | B60T 7/16 |
| | | | | 303/7 |
| 6,866,350 | B2* | 3/2005 | Palmer | B60W 10/26 |
| | | | | 188/112 A |
| 8,700,284 | B2* | 4/2014 | Wojtkowicz | B60L 7/18 |
| | | | | 903/907 |
| 9,315,173 | B1* | 4/2016 | Gray | B60T 7/042 |
| 9,407,105 | B2* | 8/2016 | Hyde | H02J 7/342 |
| 9,457,666 | B2* | 10/2016 | Caldeira | B60D 1/64 |
| 10,245,972 | B2* | 4/2019 | Healy | B60L 8/003 |
| 10,377,242 | B2* | 8/2019 | Murase | B60L 15/2045 |
| 11,007,894 | B2* | 5/2021 | Zenner | B60T 8/323 |
| 11,724,687 | B2* | 8/2023 | Salter | B60W 30/18172 |
| | | | | 701/22 |
| 11,845,360 | B2* | 12/2023 | Espig | B60L 7/18 |
| 2002/0163249 | A1* | 11/2002 | Palmer | B60K 6/48 |
| | | | | 303/121 |
| 2008/0174174 | A1* | 7/2008 | Burns | B60L 7/14 |
| | | | | 303/152 |
| 2011/0042154 | A1* | 2/2011 | Bartel | B60W 10/184 |
| | | | | 180/11 |
| 2013/0257145 | A1* | 10/2013 | Caldeira | B60L 50/61 |
| | | | | 307/9.1 |
| 2014/0025245 | A1* | 1/2014 | Fanourakis | B62D 59/04 |
| | | | | 280/433 |
| 2014/0088804 | A1* | 3/2014 | Hyde | B60L 53/12 |
| | | | | 701/22 |
| 2017/0072808 | A1* | 3/2017 | Caldeira | B60L 58/16 |
| 2018/0086227 | A1* | 3/2018 | Healy | B60L 15/2018 |
| 2019/0009760 | A1* | 1/2019 | Zenner | B60T 8/323 |
| 2020/0369253 | A1* | 11/2020 | Shah | B60T 8/1755 |
| 2021/0197673 | A1* | 7/2021 | Espig | B60L 7/18 |
| 2022/0041069 | A1* | 2/2022 | Layfield | B60L 7/10 |
| 2022/0258642 | A1* | 8/2022 | Salter | B60L 53/14 |
| 2022/0281322 | A1* | 9/2022 | Ko | B60T 8/172 |
| 2022/0324433 | A1* | 10/2022 | Salter | B60W 30/18172 |
| 2022/0388484 | A1* | 12/2022 | Salter | B60L 50/60 |
| 2023/0028030 | A1* | 1/2023 | Madineni | B60T 7/20 |
| 2023/0042880 | A1* | 2/2023 | Baumbick | B60L 55/00 |
| 2023/0158891 | A1* | 5/2023 | Rahm | B60L 7/10 |
| | | | | 318/376 |
| 2023/0246467 | A1* | 8/2023 | Salter | B60L 58/14 |
| | | | | 320/109 |
| 2023/0246471 | A1* | 8/2023 | Salter | B60L 53/305 |
| | | | | 320/109 |
| 2023/0356717 | A1* | 11/2023 | Shin | B60W 20/13 |
| 2024/0042861 | A1* | 2/2024 | Mergener | H02J 7/0042 |

FOREIGN PATENT DOCUMENTS

| | | | | | |
|---|---|---|---|---|---|
| CN | 104488160 | A | * | 4/2015 | B60D 1/64 |
| CN | 109104139 | A | * | 12/2018 | B60P 3/00 |
| CN | 109229100 | A | * | 1/2019 | B60L 15/20 |
| CN | 209170271 | U | * | 7/2019 | B60P 3/00 |
| CN | 107020970 | B | * | 1/2020 | |
| CN | 114940085 | A | * | 8/2022 | B60D 1/14 |
| CN | 115697793 | A | * | 2/2023 | B60L 1/00 |
| CN | 115705940 | A | * | 2/2023 | B60L 53/16 |
| CN | 116160854 | A | * | 5/2023 | B60L 7/02 |
| CN | 116572787 | A | * | 8/2023 | B60L 50/60 |
| CN | 116572788 | A | * | 8/2023 | B60L 50/60 |
| CN | 117162784 | A | * | 12/2023 | B60L 3/003 |
| DE | 102013208852 | A1 | * | 11/2013 | B60L 15/2009 |
| DE | 102012015099 | A1 | * | 2/2014 | B60L 11/1814 |
| DE | 102019004099 | A1 | * | 2/2020 | B60T 1/10 |
| DE | 102019207384 | A1 | * | 11/2020 | B60D 1/06 |
| DE | 102019208052 | A1 | * | 12/2020 | |
| DE | 102021131587 | A1 | * | 6/2023 | B62D 59/04 |
| IN | 202141051314 | A | * | 5/2023 | |
| JP | 2003299205 | A | * | 10/2003 | |
| JP | 2020099132 | A | * | 6/2020 | |
| WO | WO-2018064622 | A1 | * | 4/2018 | B60K 1/04 |
| WO | WO-2022061102 | A1 | * | 3/2022 | B60L 1/00 |
| WO | WO-2022061109 | A1 | * | 3/2022 | B60L 1/00 |
| WO | WO-2022084065 | A1 | * | 4/2022 | B60L 7/10 |

* cited by examiner

SYSTEMS AND METHODS FOR PROVIDING TOWING BRAKING ASSISTANCE DURING IN-FLIGHT CHARGING OF ELECTRIFIED VEHICLES

TECHNICAL FIELD

This disclosure is directed to vehicle systems and methods for coordinating and providing braking assistance during vehicle-to-vehicle towing events.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are typically charged while parked at a charging station or some other utility power source.

SUMMARY

A vehicle-to-vehicle in-flight energy transfer system according to an exemplary aspect of the present disclosure includes, among other things, a towing vehicle, a towed vehicle, and a control module programmed to request an assistive braking torque output from the towed vehicle during a towing event between the towing vehicle and the towed vehicle.

In a further non-limiting embodiment of the foregoing system, the towing vehicle is a smaller vehicle than the towed vehicle.

In a further non-limiting embodiment of either of the foregoing systems, the towed vehicle is coupled to the towing vehicle by a towing device during the towing event in which the assistive braking torque output is requested.

In a further non-limiting embodiment of any of the foregoing systems, the towing event is an in-flight bidirectional charging towing event.

In a further non-limiting embodiment of any of the foregoing systems, the control module is a component of the towing vehicle.

In a further non-limiting embodiment of any of the foregoing systems, the control module is programmed to command a transmission of a braking assistance request signal to the towed vehicle when a brake pedal of the towing vehicle is pressed.

In a further non-limiting embodiment of any of the foregoing systems, the braking assistance request signal includes braking-related data associated with the towing vehicle.

In a further non-limiting embodiment of any of the foregoing systems, the braking-related data includes at least a travel distance of the brake pedal, a pressure applied to the brake pedal, and a wheel speed or vehicle speed of the towing vehicle.

In a further non-limiting embodiment of any of the foregoing systems, the braking assistance request signal includes a command for providing a desired amount of the assistive braking torque output.

In a further non-limiting embodiment of any of the foregoing systems, the control module is programmed to command that manual braking controls of the towed vehicle be disabled during the towing event.

In a further non-limiting embodiment of any of the foregoing systems, the assistive braking torque output is configured to mimic a deceleration rate of the towing vehicle.

In a further non-limiting embodiment of any of the foregoing systems, the assistive braking torque output is configured to compensate for a brake fade condition of the towing vehicle.

In a further non-limiting embodiment of any of the foregoing systems, the assistive braking torque output is configured to compensate for a vehicle stability condition of the towing vehicle.

An electrified vehicle according to another exemplary aspect of the present disclosure includes, among other things, a drive wheel, a braking system adapted for decelerating the drive wheel, and a control module programmed to control the braking system for applying a braking torque output for decelerating the drive wheel in response to receiving a braking assistance request signal during a towing event.

In a further non-limiting embodiment of the foregoing electrified vehicle, the braking assistance request signal is received from a second electrified vehicle.

In a further non-limiting embodiment of either of the forgoing electrified vehicles, a telecommunications module is configured for establishing bidirectional communications between the electrified vehicle and the second electrified vehicle.

In a further non-limiting embodiment of any of the foregoing electrified vehicles, the control module is a component of the electrified vehicle being towed during the towing event.

In a further non-limiting embodiment of any of the foregoing electrified vehicles, the braking assistance request signal includes braking-related information received from a second electrified vehicle that is coupled to the electrified vehicle during the towing event.

In a further non-limiting embodiment of any of the foregoing electrified vehicles, the control module is programmed to calculate the braking torque output necessary for achieving a target deceleration rate indicated by the braking assistance request signal and communicate a braking command signal to the braking system for commanding the braking system to apply the braking torque output.

A method according to another exemplary aspect of the present disclosure includes, among other things, during a towing event in which a towing vehicle is towing a towed vehicle, controlling the towed vehicle to provide an assistive braking output torque for achieving a target deceleration rate of the towing vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to systems and methods for coordinating and providing braking assistance between towing vehicles and towed vehicles during towing events, such as bidirectional charging towing events, for example. The towing braking assistance may be provided by the towed vehicle in the form of an assistive braking torque output to assist the towing vehicle with meeting a target deceleration rate during the towing event. The assistive braking torque output may be provided to account for mutual vehicle deceleration events, brake compensation or brake fade events, and stability events of the coupled vehicles during the towing events, for example. These and other features of this disclosure are discussed in greater detail in the following paragraphs of this detailed description.

Figure 1:
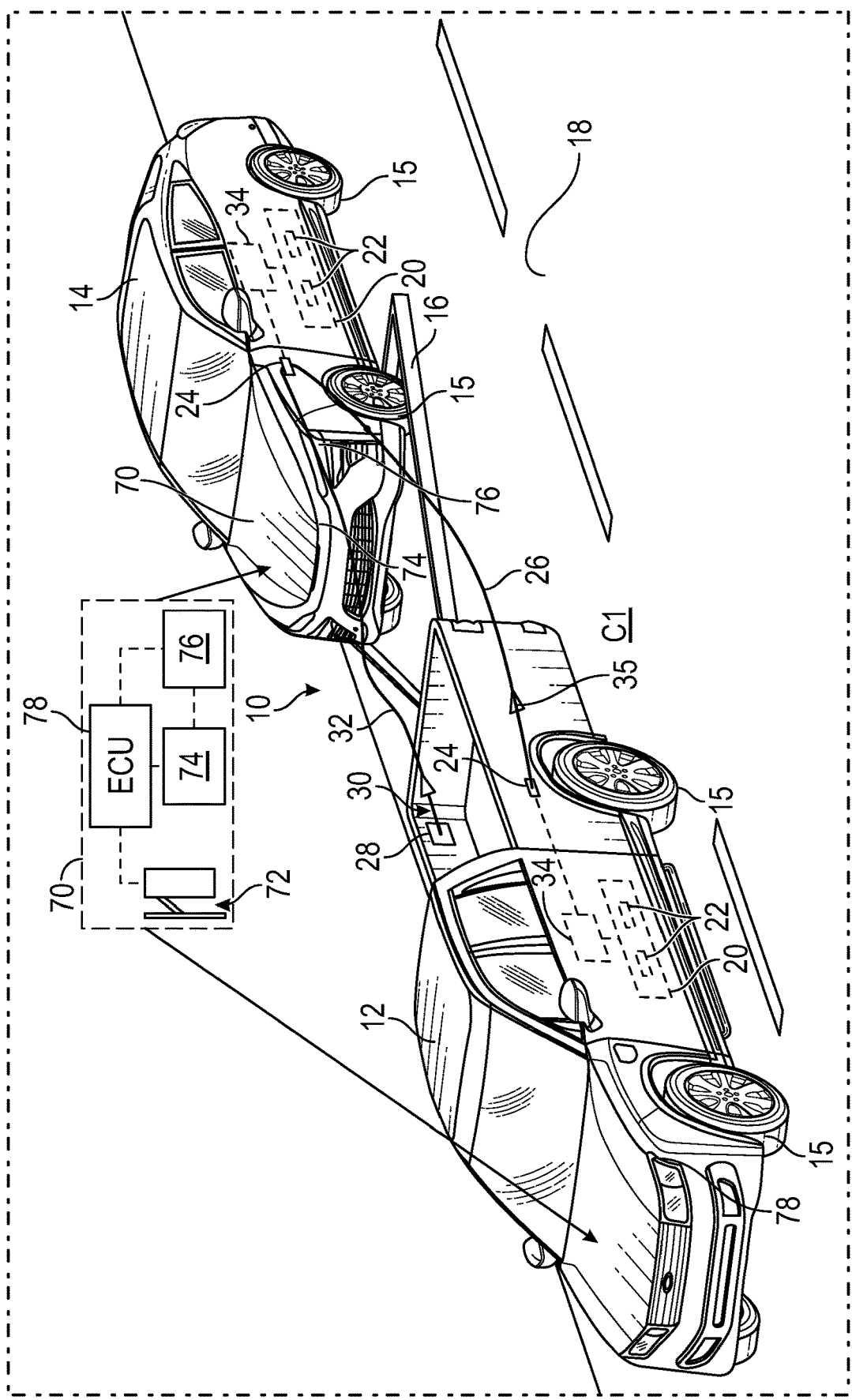
FIG. 1 schematically illustrates a first in-flight configuration of a vehicle-to-vehicle energy transfer system during a towing event.
Figure 2:
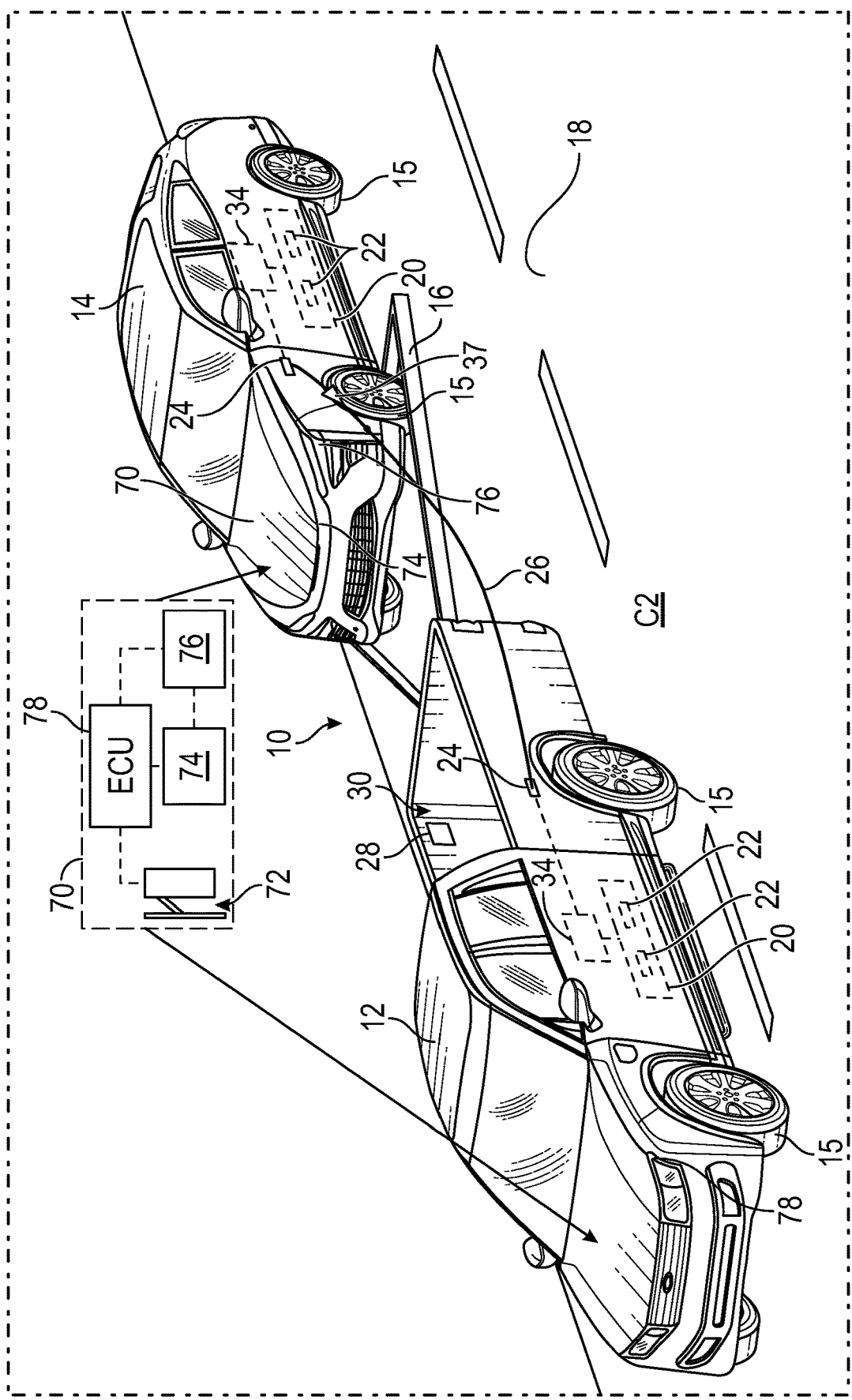
FIG. 2 schematically illustrates a second in-flight configuration of the vehicle-to-vehicle energy transfer system of FIG. 1.

FIGS. 1 and 2 schematically illustrate an exemplary vehicle-to-vehicle (V2V) in-flight energy transfer system 10 (hereinafter "the system 10") for bidirectionally transferring energy between a towing or leading vehicle 12 and a towed or trailing vehicle 14 during a towing event. In this disclosure, the term "in-flight" means during the coupled movement of the leading vehicle 12 and the trailing vehicle 14. Accordingly, the system 10 enables the bidirectional transfer of energy from the leading vehicle 12 to the trailing vehicle 14 or vice-versa while the leading and trailing vehicles 12, 14 are coupled together and making forward progress toward their desired destinations.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

The in-flight energy transfer afforded by the system 10 is beneficial to both participating parties. For example, the user/owner of the trailing vehicle 14 may take advantage of the time while being towed by resting, sleeping, eating, working, etc., and the user/owner of the leading vehicle 12 may generate income for performing the towing/charging task (e.g., revenue opportunity).

A towing device 16 may releasably couple the trailing vehicle 14 relative to the leading vehicle 12 to allow the leading vehicle 12 to pull the trailing vehicle 14 along a roadway 18 and thus control driving of the trailing vehicle 14 during a towing event. The towing device 16 could by any type of towing device. Accordingly, the specific configuration of the towing device 16 is not intended to limit this disclosure.

In an embodiment, the leading vehicle 12 and the trailing vehicle 14 are both plug-in type electrified vehicles (e.g., a plug-in hybrid electric vehicle (PHEV) or a battery electric vehicle (BEV)). Each of the leading and trailing vehicles 12, 14 includes a traction battery pack 20. The leading vehicle 12 and the trailing vehicle 14 may each include an electrified powertrain capable of applying a propulsive torque from an electric machine (e.g., an electric motor) for driving drive wheels 15 of the leading and trailing vehicles 12, 14. Therefore, the powertrain of each of the leading vehicle 12 and the trailing vehicle 14 may electrically propel the respective set of drive wheels 15 either with or without the assistance of an internal combustion engine.

Although shown schematically, each traction battery pack 20 may be configured as a high voltage traction battery pack that includes a plurality of battery arrays 22 (i.e., battery assemblies or groupings of battery cells) capable of outputting electrical power to one or more electric machines of each vehicle. Other types of energy storage devices and/or output devices may also be used to electrically power each of the leading vehicle 12 and the trailing vehicle 14.

From time to time, charging the energy storage devices of the traction battery pack 20 of each of the leading vehicle 12 and the trailing vehicle 14 may be required or desirable. Each of the leading and trailing vehicles 12, 14 may therefore be equipped with a charging system that includes a charge port assembly 24. A charge cable 26 (e.g., EVSE) may be connected to the corresponding charge port assemblies 24 of the leading and trailing vehicles 12, 14 in order to transfer charge energy from the traction battery pack 20 of the leading vehicle 12 or the trailing vehicle 14 to the traction battery pack 20 of the other of the leading vehicle 12 or the trailing vehicle 14. The charge cable 26 may be configured to provide any level of charging (e.g., Level 1 AC charging, Level 2 AC charging, DC charging, etc.).

The charging system of the leading vehicle 12 could optionally be equipped with a secondary charge port assembly 28. In an embodiment, the secondary charge port assembly 28 is mounted within a cargo space 30 of the leading vehicle 12 for providing access to a power source at an external location of the leading vehicle 12. A charge cable 32 may be connected to the secondary charge port assembly 28 and the charge port assembly 24 of the trailing vehicle 14 in order to transfer charge energy from the traction battery pack 20 of one of the leading vehicle 12 or the trailing vehicle 14 to the traction battery pack 20 of the other of the leading vehicle 12 or the trailing vehicle 14. The charge cable 32 may be configured to provide Level 1 or Level 2 AC charging, for example. In another embodiment, energy can be transferred between the leading and trailing vehicles 12, 14 using both the charge cable 26 and the charge cable 32. Although not specifically shown, the leading vehicle 12 and/or the trailing vehicle 14 could be equipped with one or more additional charging interfaces.

The respective charging systems of the leading and trailing vehicles 12, 14 may additionally include a bidirectional power transfer system 34 configured for enabling the bidirectional transfer of power between the vehicles 12, 14. The bidirectional power transfer system 34 may be operably connected between the charge port assembly 24 and the traction battery pack 20 of each of the leading vehicle 12 and the trailing vehicle 14. The bidirectional power transfer system 34 may include various equipment, such as a charger, a converter, a motor controller (which may be referred to as an inverter system controller or ISC), etc., arranged and configured to establish the bidirectional transfer of electrical energy between the respective traction battery packs 20 of the leading and trailing vehicles 12, 14. The bidirectional power transfer systems 34 may additionally be configured to transfer energy between the traction battery packs 20 and the electric machines of each respective vehicle.

One non-limiting example of a suitable bidirectional power transfer system that may be employed for use within the leading vehicle 12 and/or the trailing vehicle 14 for achieving bidirectional power transfer is disclosed within US Patent Publication No. 2020/0324665, assigned to Ford Global Technologies, LLC, the disclosure of which is incorporated by reference herein. However, other bidirectional power transfer systems could also be utilized for achieving the bidirectional transfer of power between the leading and trailing vehicles 12, 14 within the scope of this disclosure.

FIG. 1 schematically illustrates a first in-flight configuration C1 of the system 10. During the first in-flight configuration C1, power may be transferred from the traction battery pack 20 of the leading vehicle 12 to the traction battery pack 20 of the trailing vehicle 14 (as schematically depicted by arrow 35).

FIG. 2 schematically illustrates a second in-flight configuration C2 of the system 10. During the second in-flight configuration C2, power may be transferred from the traction battery pack 20 of the trailing vehicle 14 to the traction battery pack 20 of the leading vehicle 12 (as schematically illustrated by arrow 37). In this way, the trailing vehicle 14 may charge the leading vehicle 12 during the in-flight towing and charging event, such as for increasing the towing distance that the leading vehicle 12 is capable of towing the trailing vehicle 14, for example.

The teachings of this disclosure may be applicable for any type of vehicle as the leading vehicle 12 and for any type of vehicle as the trailing vehicle 14. For example, the leading vehicle 12 or the trailing vehicle 14 could be configured as a car, a truck, a van, a sport utility vehicle (SUV), etc.

The leading vehicle 12 of FIGS. 1-2 is schematically illustrated as a pickup truck, and the trailing vehicle 14 of FIGS. 1-2 is schematically illustrated as a car. Thus, the trailing vehicle 14 is the smaller of the two vehicles in the embodiment of FIGS. 1-2. However, the leading vehicle 12 could alternatively be configured as the smaller of the two vehicles, and the trailing vehicle 14 could be configured as the larger of the two vehicles (see, e.g., the embodiment of FIG. 3).

Each of the leading and trailing vehicles 12, 14 may additionally be equipped with a braking system 70 for controlling braking of each respective vehicle. Each braking system 70 may be configured to produce a braking torque output for applying a friction force to the drive wheels 15 for decelerating the vehicles 12, 14, for example. In an embodiment, each braking system 70 is part of an electronic brake booster (EBB) system. However, other types of braking systems are also contemplated within the scope of this disclosure.

Each braking system 70 may include, among other things, a brake pedal 72, an electric actuator 74, a braking device 76, and an electronic control unit (ECU) 78 that are operably coupled to one another for performing vehicle braking actions. The ECU 78 may monitor a pedal position of the brake pedal 72, such as via a pedal travel sensor, for example. When a force is applied to the brake pedal 72, the ECU 78 may determine a target deceleration rate, such as be referencing a look-up table that correlates pedal travel distance of the brake pedal 72 to target deceleration rate of the vehicle. The ECU 78 may then command the electric actuator 74 (e.g., an electric pump, electric motor, etc.) to provide a braking torque output that is necessary for achieving the target deceleration rate. The braking torque output may be applied to the braking device 76 (e.g., friction brakes) for engaging the drive wheels 15 at a sufficient force for achieving the target deceleration rate.

Figure 3:
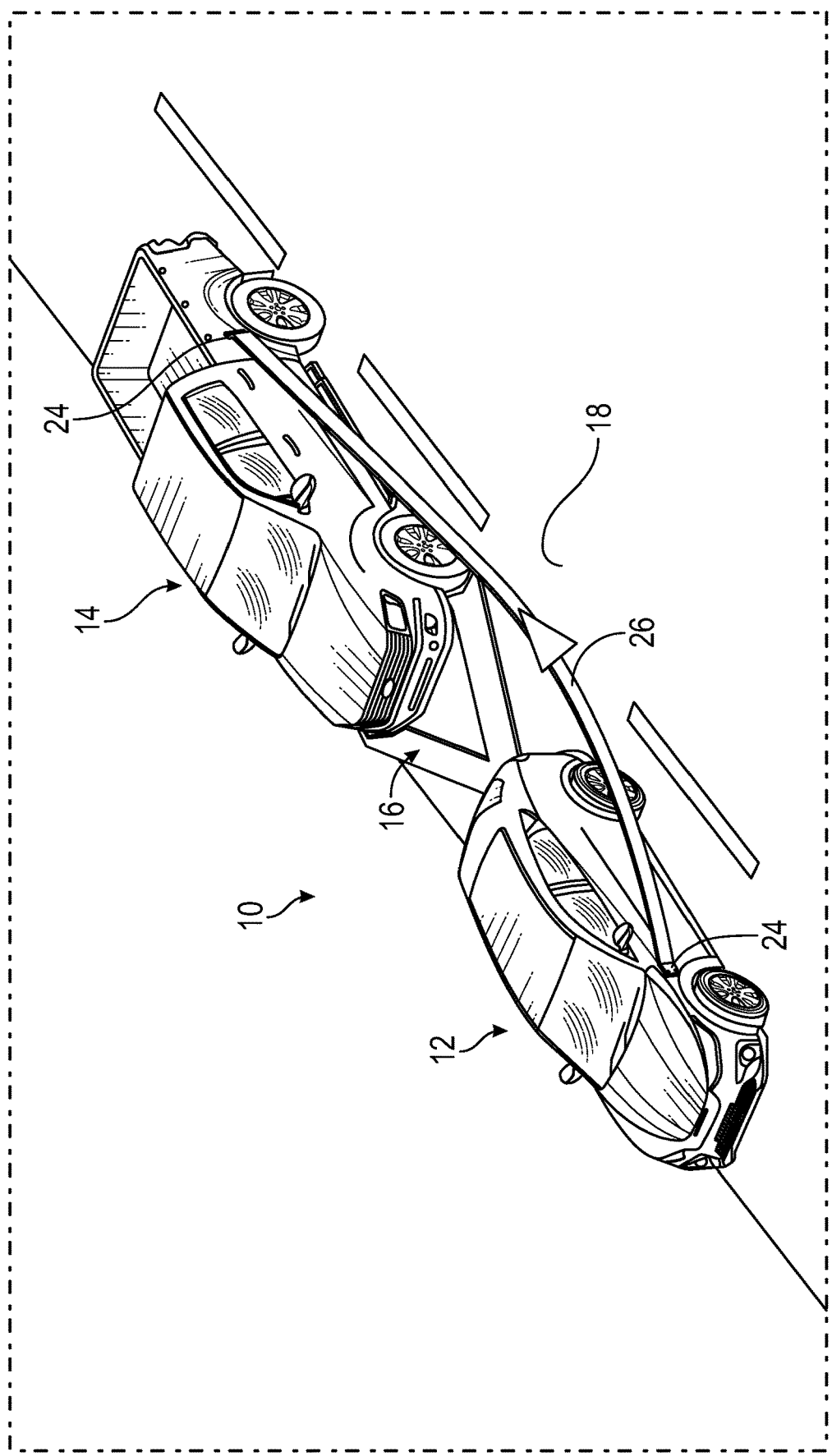
FIG. 3 schematically illustrates another towing event of a vehicle-to-vehicle energy transfer system.

In any of the scenarios depicted in FIGS. 1-3, the leading vehicle 12 could potentially require braking assistance from the trailing vehicle 14 for controlling the coupled deceleration of the vehicles 12, 14 during select portions of the towing event. Braking assistance from the trailing vehicle 14 may be provided in the form of an assistive braking torque output (e.g., by controlling the electric actuator 74 of the braking system 70 of the trailing vehicle 14) to help decelerate the vehicles 12, 14 during towing events. For example, the assistive braking torque output may be helpful for accounting for mutual vehicle deceleration events, brake compensation or brake fade events, stability events, etc. during the towing events. This disclosure therefore describes exemplary embodiments for coordinating and providing braking assistance from the trailing vehicle 14 to the leading vehicle 12 during towing events.

Figure 4:
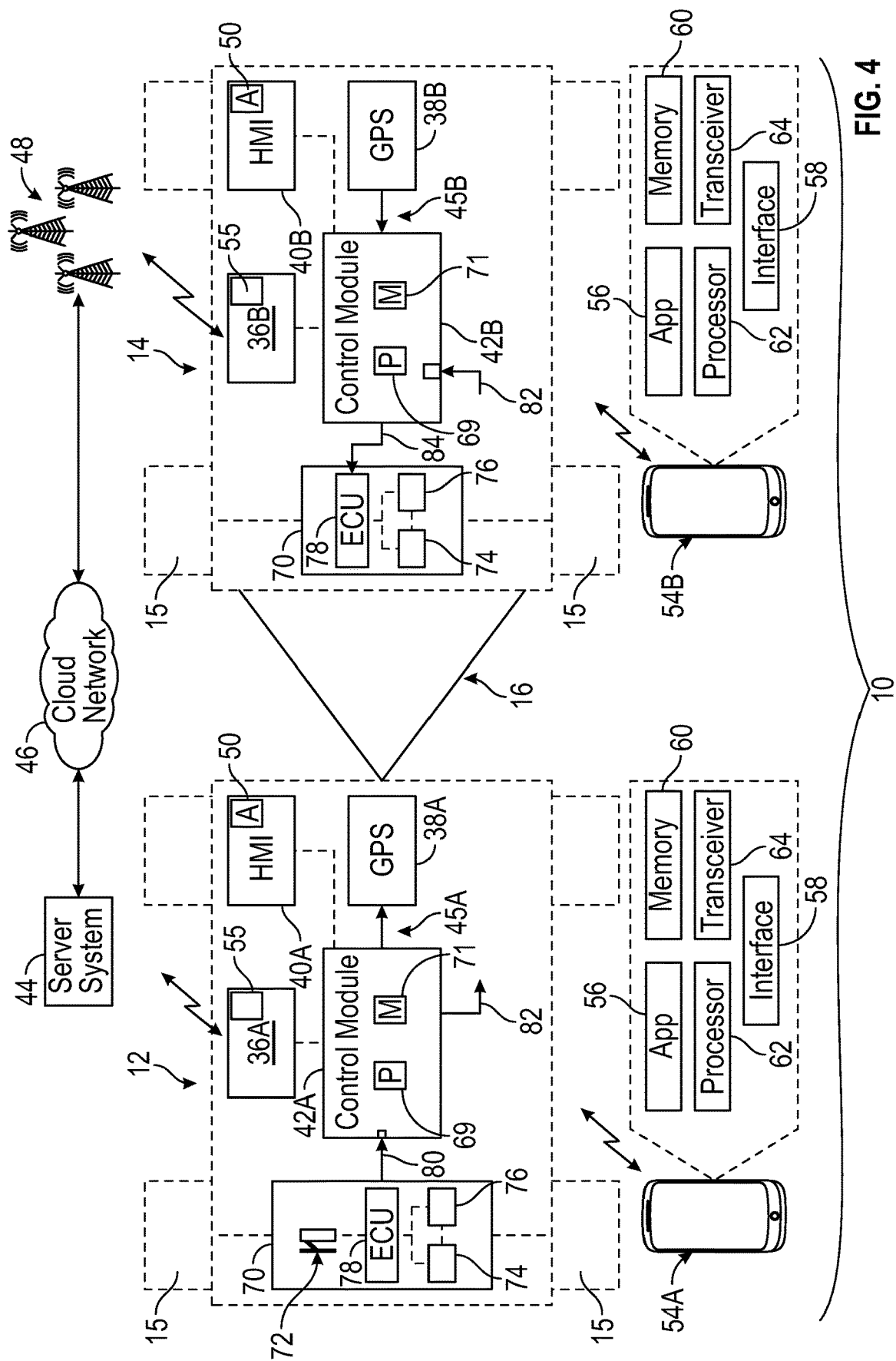
FIG. 4 schematically illustrates exemplary braking assistance aspects of a vehicle-to-vehicle energy transfer system.

Additional functionality of the system 10 of FIGS. 1-3 is further detailed in FIG. 4. In particular, FIG. 4 schematically illustrates exemplary features that enable the system 10 to provide braking assistance from the trailing vehicle 14 to the leading vehicle 12 for achieving adequate braking controls during select portions of a towing event between the respective vehicles. The braking assistance may be provided during the towing event whether or not energy is concurrently being supplied from the leading vehicle 12 to the trailing vehicle 14 or from the trailing vehicle 14 to the leading vehicle 12.

The system 10 may include components from both the leading vehicle 12 and the trailing vehicle 14. For example, the leading vehicle 12 may include a telecommunications module 36A, a global positioning system (GPS) 38A, a human machine interface (HMI) 40A, and a control module 42A. These components may be interconnected and in electronic communication with one another over a communication bus 45A. The communication bus 45A may be a wired communication bus such as a controller area network (CAN) bus, or a wireless communication bus such as Wi-Fi, Bluetooth®, Ultra-Wide Band (UWB), etc.

As further part of the system 10, the trailing vehicle 14 may include a telecommunications module 36B, a global positioning system (GPS) 38B, a human machine interface (HMI) 40B, and a control module 42B. These components may be interconnected and in electronic communication with one another over a communication bus 45B. The communication bus 45B may be a wired communication bus such as a controller area network (CAN) bus, or a wireless communication bus such as Wi-Fi, Bluetooth®, Ultra-Wide Band (UWB), etc.

The telecommunications modules 36A, 36B may be configured for achieving bidirectional communications between the leading vehicle 12 and the trailing vehicle 14 over a cloud-based server system 44, such as for scheduling and executing in-flight vehicle-to-vehicle bidirectional energy transfers, for example. Each telecommunications module 36A, 36B may communicate over a cloud network 46 (i.e., the internal to obtain various information stored on the server system 44 or to provide information to the server system 44 that can subsequently be accessed by the leading vehicle 12 and/or the trailing vehicle 14 (or other participating vehicles). The server system 44 can identify, collect, and store user data associated with both the leading vehicle 12 and the trailing vehicle 14 for validation purposes. Upon an authorized request, data may be subsequently transmitted to the telecommunications modules 36A, 36B via one or more cellular towers 48 or via some other known communication technique (e.g., Wi-Fi, Bluetooth®, data connectivity, etc.). The information can then be communicated to the control module 42A, 42B for further processing. Each telecommunications module 36A, 36B can receive data from the server system 44 or communicate data back to the server system 44 via the cellular tower(s) 48. Although not necessarily shown or described in this highly schematic embodiment, numerous other components may enable bidirectional communications between the vehicles 12, 14 via the server system 44.

In an embodiment, a user/owner of the leading vehicle 12 and/or the trailing vehicle 14 may interface with the server system 44 using the HMI 40A, 40B. For example, each HMI 40A, 40B may be equipped with an application 50 (e.g., FordPass™ or another similar application) for interfacing with the server system 44. Each HMI 40A, 40B may be located within a passenger cabin of its respective vehicle and may include various user interfaces for displaying information to the vehicle occupants and for allowing the vehicle occupants to enter information into the HMI 40A, 40B. The vehicle occupants may interact with the user interfaces via touch screens, tactile buttons, audible speech, speech synthesis, etc.

In another embodiment, the user/owner of the leading vehicle 12 and/or the trailing vehicle 14 could alternatively or additionally interface with the server system 44 using a personal electronic device 54A, 54B (e.g., a smart phone, tablet, computer, wearable smart device, etc.). Each personal electronic device 54A, 54B may include an application 56 (e.g., FordPass™ or another similar application) that includes programming to allow the user to employ one or more user interfaces 58 for setting or controlling certain aspects of the system 10. The application 56 may be stored in memory 60 of the personal electronic device 54A, 54B and may be executed by a processor 62 of the personal electronic device 54A, 54B. Each personal electronic device 54A, 54B may additionally include a transceiver 64 that is configured to communicate with the server system 44 over the cellular tower(s) 48 or some other wireless link.

Each telecommunications module 36A, 36B may additionally include one or more wireless devices 55 that facilitate the detection of and communication with nearby vehicles, such as the leading vehicle 12 or the trailing vehicle 14, for example. Various information and signals, including braking-related information and signals, may be exchanged between the leading vehicle 12 and the trailing vehicle 14 via the wireless devices 55. In an embodiment, the wireless devices 55 are Bluetooth® Low Energy (BLE) transceivers configured to receive and/or emit low energy signals as a way to detect and communicate with participating vehicles. However, other types of wireless devices (e.g., WiFi, V2V, etc.) are also contemplated within the scope of this disclosure for enabling bidirectional communications between the leading vehicle 12 and the trailing vehicle 14.

Each GPS 38A, 38B is configured to pinpoint an exact location of the leading vehicle 12 or trailing vehicle 14, such as by using satellite navigation techniques. In an embodiment, the location data from the GPS 38A and/or the GPS 38B may be utilized to aid in determining a grade of the roadway 18 that the vehicles are traveling along during the towing event. Among other beneficial uses, the grade information can be helpful for determining the correct braking torque outputs to apply during towing braking events.

The control modules 42A, 42B may each include both hardware and software and could be part of an overall vehicle control system, such as a vehicle system controller (VSC), or could alternatively be a stand-alone controller separate from the VSC. In an embodiment, each control module 42A, 42B is programmed with executable instructions for interfacing with and commanding operation of various components of the system 10. Although shown as separate modules within the highly schematic depiction of FIG. 4, the telecommunications module, the GPS, the HMI, and the control module could be integrated together as part of common module within each of the leading vehicle 12 and the trailing vehicle 14.

Each control module 42A, 42B may include a processor 69 and non-transitory memory 71 for executing various control strategies and modes associated with the system 10. The processors 69 can be custom made or commercially available processors, central processing units (CPUs), or generally any device for executing software instructions. The memory 71 can include any one or combination of volatile memory elements and/or nonvolatile memory elements. The processor 69 may be operably coupled to the memory 71 and may be configured to execute one or more programs stored in the memory 71 of each control module 42A, 42B based on the various inputs received from other devices.

In an embodiment, based at least on a first input signal 80 received from the braking system 70 of the leading vehicle 12, the control module 42A may communicate (e.g., via the telecommunications modules 36A, 36B) a braking assistance request signal 82 to the control module 42B of the trailing vehicle 14. The first input signal 80 indicates that a force has been applied to the brake pedal 72 of the leading vehicle 12 (e.g., by a user's foot) and may include braking-related data associated with the leading vehicle 12. The braking-related data may include, but is not limited to, a travel distance of brake pedal 72, a pressure of the brake pedal 72, vehicle weight, size of drive wheels 15, size of brake device 76, temperature of brake device 76, drive wheel 15 speed sensor information (e.g., speed, acceleration, deceleration, etc.), etc. The first input signal 80 may also include information such as the target deceleration rate of the leading vehicle 12.

The braking assistance request signal 82 indicates to the trailing vehicle 14 that the leading vehicle 12 requires braking assistance for achieving a target deceleration rate during the towing event. For example, the braking assistance could be needed to achieve mutual vehicle deceleration, to achieve brake compensation, to achieve improved stability during braking, etc.

Target deceleration data that may be derived from the braking-related data associated with the leading vehicle 12 may be included as part of the braking assistance request signal 82. In response to receiving the braking assistance request signal 82, the control module 42B of the trailing vehicle 14 may calculate the required braking compensation necessary for achieving the target deceleration rate. The control module 42B of the trailing vehicle 14 may then communicate a braking command signal 84 to the braking system 70 of the trailing vehicle 14 for commanding the braking system 70 to execute the necessary braking torque output at the trailing vehicle 14 for achieving the target deceleration rate. In this way, the trailing vehicle 14 may be operated in coordination with the leading vehicle 12 in order to provide a towing braking system that can decelerate the coupled vehicles as a single unit during towing events.

The information included as part of the braking command signal 84 may vary depending on the specifics of the target deceleration rate for achieving various braking use cases of the system 10. In an embodiment, the actual braking torque output of the trailing vehicle 14 depends on factors such as vehicle speed or drive wheel speed, brake pedal travel, and the hydraulic pressure of the leading vehicle 12.

In another embodiment, the braking assistance request signal 82 may include the exact braking torque output required from the trailing vehicle 14 for meeting the target deceleration rate. In such an embodiment, the control module 42A may be programmed for determining the amount of braking torque output required from both the leading vehicle 12 and the trailing vehicle 14 for achieving the target deceleration rate.

In some embodiments, the braking system 70 of the trailing vehicle 14 may be controlled to completely remove the braking burden of the trailing vehicle 14 from the braking system 70 of the leading vehicle 12. In other embodiments, the braking system 70 of the trailing vehicle 14 may be controlled to compensate for wheel slip conditions detected in leading vehicle 12.

In an embodiment, the braking command signal 84 may command that the braking system 70 of the trailing vehicle 14 mimic the deceleration rate of the leading vehicle 12 during a detected braking event. Thus, the braking torque output of the trailing vehicle 14 may be controlled to be equal to that of the leading vehicle 12 during some towing braking conditions.

In another embodiment, the braking command signal 84 may be configured to command the braking system 70 to optimize the braking torque output of the trailing vehicle 14 in order to compensate for brake fade conditions of the leading vehicle 12. For example, the braking command signal 84 may command the braking system 70 of the trailing vehicle 14 to increase the braking torque output when a target deceleration rate has not been achieved to within a predefined threshold percentage of the target. Thus, the braking torque output of the trailing vehicle 14 may be controlled to be a different output from that of the leading vehicle 12 during some towing braking conditions.

In yet another embodiment, the braking command signal 84 may command the braking system 70 to optimize the braking torque output of the trailing vehicle 14 during detected stability events (e.g., wheel slip conditions, etc.) of the leading vehicle 12. The braking command signal 84 may command the braking system 70 of the trailing vehicle 14 to output the braking torque output necessary for maximizing deceleration through added/subtracted braking torque output during stability events. For example, when the target deceleration rate is not met during a detected stability event of the leading vehicle 12, the braking system 70 of the trailing vehicle 14 can be commanded to provide a maximum braking torque output until the stability event subsides. Other braking use cases are further contemplated within the scope of this disclosure for achieving target deceleration rates as part of a towed braking system.

Figure 5A:
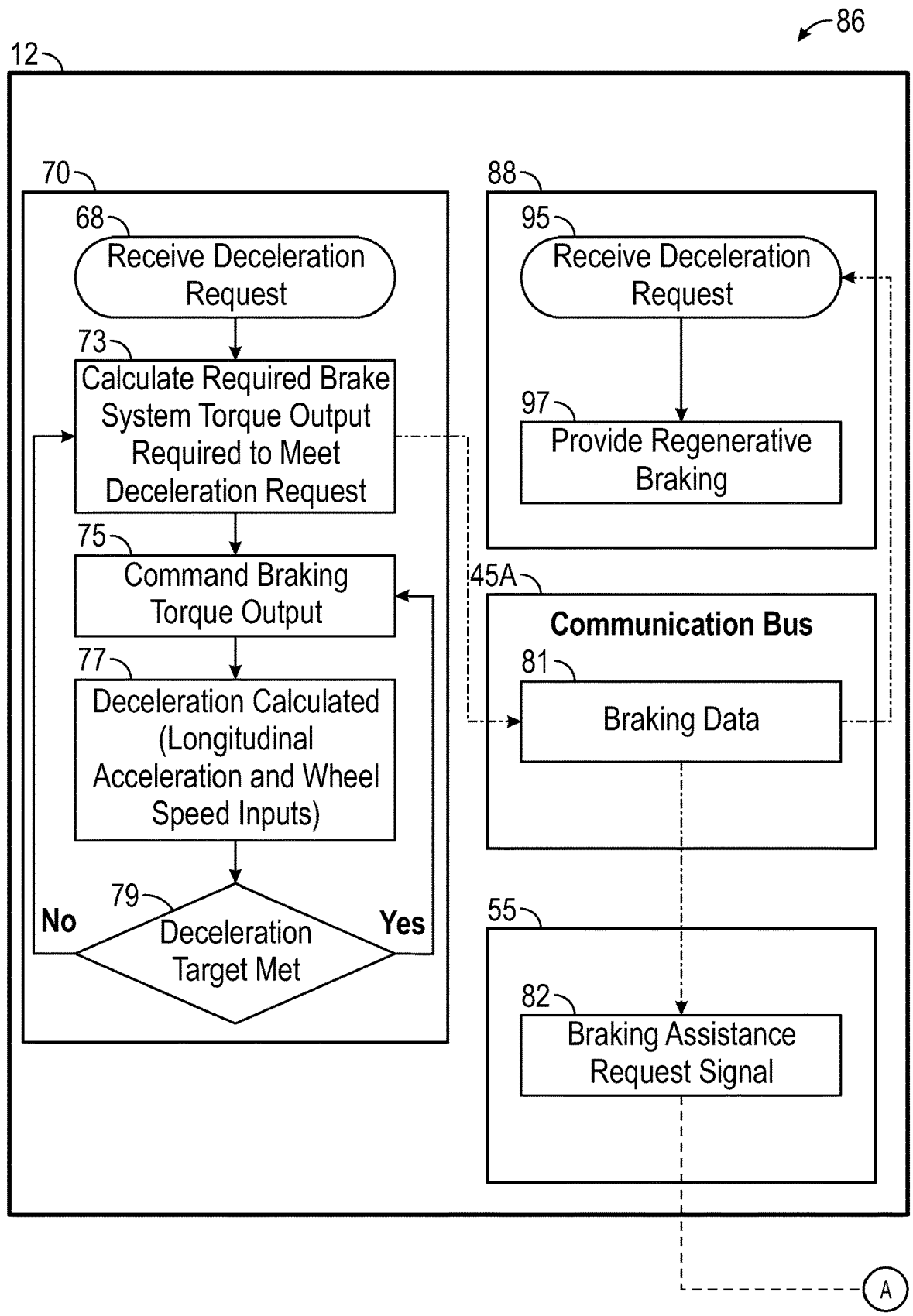
FIGS. 5A and 5B schematically illustrates an exemplary braking control system of a vehicle-to-vehicle energy transfer system.
Figure 5B:
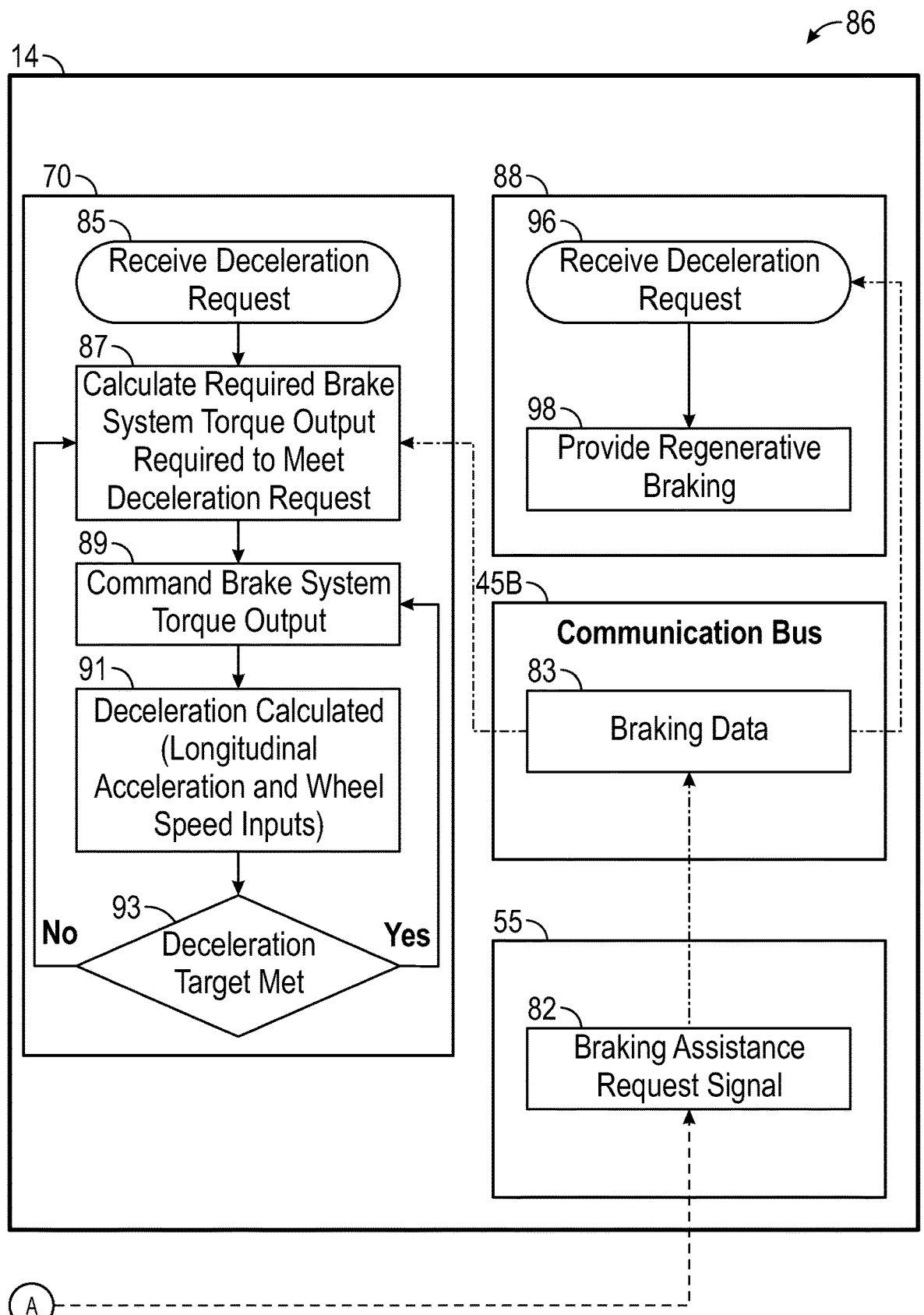

FIGS. 5A and 5B illustrate a block diagram of an exemplary braking control system 86 that can be utilized by the system 10 of FIGS. 1-4. In an embodiment, the braking control system 86 is a closed-loop braking control system in which, based on a target deceleration rate of the leading vehicle 12 that may be derived from a travel distance of the brake pedal 72, the respective braking torque outputs of the leading vehicle 12 and the trailing vehicle 14 may be coordinated and outputted for achieving the target deceleration rate.

The braking control system 86 may leverage components from both the leading vehicle 12 and the trailing vehicle 14 for controlling braking of the vehicles 12, 14 during towing events. For example, the braking control system 86 may include the braking system 70, the wireless device 55, and a powertrain control module 88 of both the leading vehicle 12 and the trailing vehicle 14. The braking system 70, the wireless device 55, and the powertrain control module 88 of the leading vehicle 12 may communicate over the communication bus 45A, and the braking system 70, the wireless device 55, and the powertrain control module 88 of the trailing vehicle 14 may communicate over the communication bus 45B. Data, signals, and other information may be exchanged between the leading vehicle 12 and the trailing vehicle 14 via the wireless devices 55.

An exemplary control sequence of the braking control system 86 of FIGS. 5A and 5B will now be described. The control sequence may begin when a user depresses the brake pedal 72 of the leading vehicle 12. When this occurs, the braking system 70 of the leading vehicle 12 may receive a deceleration request (shown schematically at block 68). The deceleration request indicates the need to apply the brake device 76 of the braking system 70 for slowing/stopping the movement of the drive wheels 15 of the leading vehicle 12 to achieve a target deceleration rate.

The braking system 70 may calculate a braking torque output that is necessary for meeting the deceleration request (shown schematically at block 73) in response to receiving the deceleration request. The braking torque output may then be commanded by controlling the actuator 74 of the braking system 70 in order to apply the brake device 76 (shown schematically at block 75). The vehicle deceleration is then monitored (shown schematically at block 77) to determine whether the target deceleration has been achieved (shown schematically at block 79).

In addition to commanding the braking torque output, the braking system 70 may communicate braking-related data over the communication bus 45A (shown schematically at block 81). The braking assistance request signal 82 may then be communicated from the leading vehicle 12 to the trailing vehicle 14 via the wireless devices 55. The braking assistance request signal 82 may include the braking-related data and/or the target deceleration rate.

Upon receiving the braking assistance request signal 82, the braking-related data may be communicated over the communication bus 45B of the trailing vehicle 14 (shown schematically at block 83). The braking system 70 of the trailing vehicle 14 may then receive the deceleration request, which may include the target deceleration rate (shown schematically at block 85).

The braking system 70 of the trailing vehicle 14 may next calculate a braking torque output that is necessary for meeting the deceleration request (shown schematically at block 87) in response to receiving the deceleration request. The braking torque output may then be commanded by controlling the actuator 74 of the braking system 70 in order to apply the brake device 76 (shown schematically at block 89). The vehicle deceleration is then monitored (shown schematically at block 91) to determine whether the target deceleration has been achieved (shown schematically at block 93).

The exemplary control sequence schematically illustrated by FIGS. 5A and 5B may be repeated in a closed-loop fashion each time a braking event of the leading vehicle 12 is initiated during the towing event. The braking control system 86 may therefore aid in establishing coordinated braking controls between the leading and trailing vehicles 12, 14 during towing events.

The braking control system 86 may be further configured to leverage regenerative braking charging for transferring energy to the recipient vehicle's traction battery pack 20 during "hard stop" braking events. For example, the powertrain control modules 88 of the leading vehicle 12 and the trailing vehicle 14 may also receive the deceleration request during braking events (see blocks 95 and 96, respectively). Depending on whether the deceleration request exceeds a predefined threshold for indicating a "hard stop" braking event, the powertrain control modules 88 may command the regenerative braking (see blocks 97 and 98, respectively).

Figure 6:
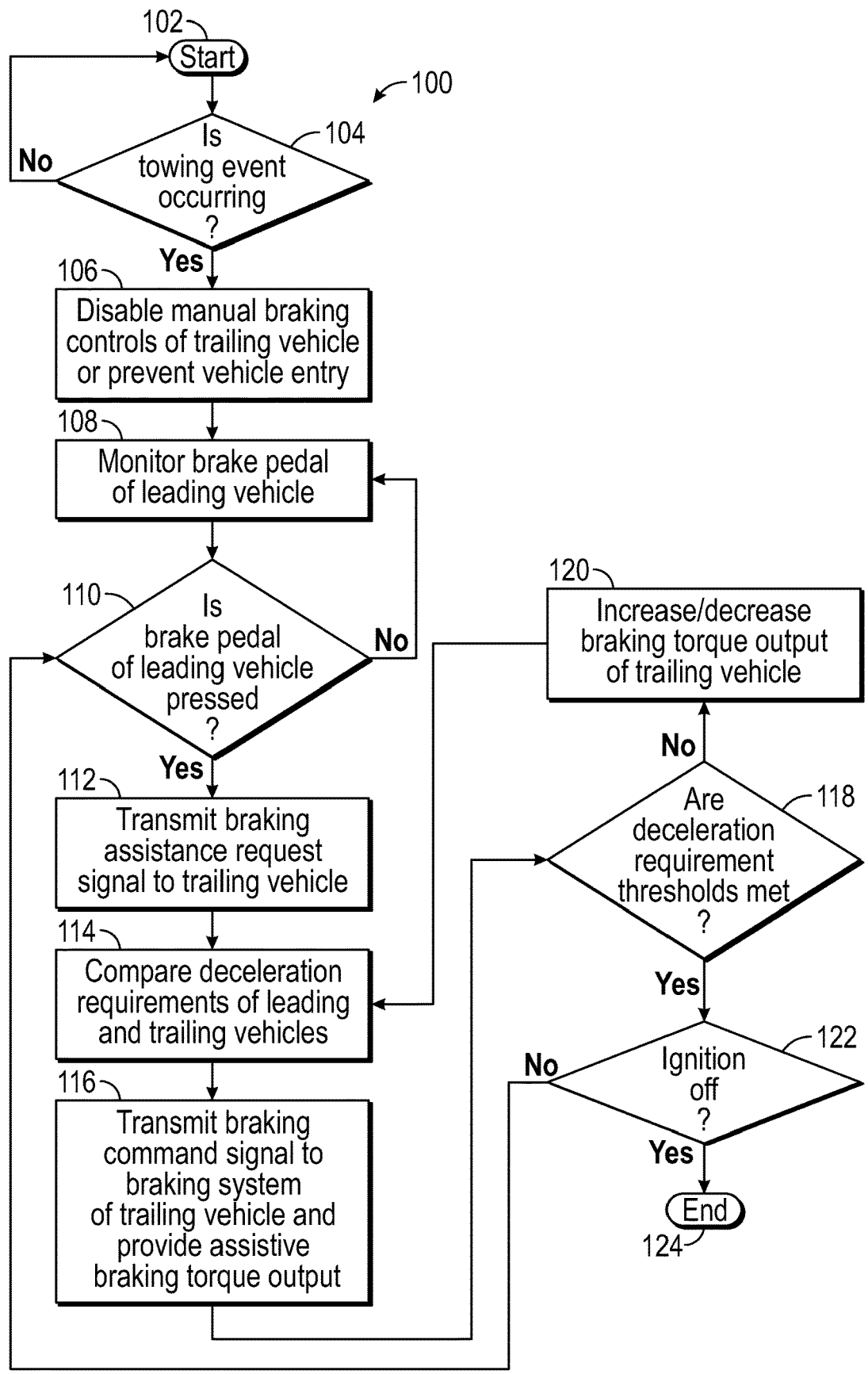
FIG. 6 is a flow chart of an exemplary method for providing braking assistance during vehicle towing events.

FIG. 6, with continued reference to FIGS. 1-5, schematically illustrates in flow chart form an exemplary method 100 for coordinating and providing braking assistance between the trailing vehicle 14 and the leading vehicle 12 during towing events in which the leading vehicle 12 is towing the trailing vehicle 14. The system 10 may be configured to employ one or more algorithms adapted to execute the steps of the exemplary method 100. For example, the method 100 may be stored as executable instructions in the memory 71 of each control module 42A, 42B, and the executable instructions may be embodied within any computer readable medium that can be executed by the processor 69 of each of the control modules 42A, 42B.

The exemplary method 100 may begin at block 102. At block 104, the method 100 may determine whether the leading vehicle 12 and the trailing vehicle 14 are engaged in a towing event. In an embodiment, the towing event is an in-flight bidirectional charging towing event in which the leading vehicle 12 and the trailing vehicle are connected by the towing device 16 and are further operably connected for achieving the bi-directional transfer of energy. Notably, however, energy does not need to be transferred continuously between the vehicles 12, 14 in order for the method 100 to be executed. Stated another way, there may be situations in which the leading vehicle 12 requires braking assistance during the towing event but energy is not currently being transferred between the respective vehicles for charging purposes.

If a YES flag is returned at block 104, the method 100 may optionally proceed to block 106 by disabling the manual braking controls of the trailing vehicle 14. Disabling the manual braking controls of the trailing vehicle 14 prevents a user of the trailing vehicle 14 from applying manual braking inputs to the braking system 70 of the trailing vehicle 14 during the towing event. The manual braking controls of the trailing vehicle 14 may be re-enabled once the trailing vehicle 14 is decoupled from the leading vehicle 12 upon completion of the towing event. Alternatively, entry to the trailing vehicle 14 may optionally be prevented at block 106.

Next, at block 108, the method 100 may monitor a position of the brake pedal 72 of the leading vehicle 12. The method 100 may determine whether the brake pedal 72 has been pressed at block 110. The method 100 may assume a towing braking event is occurring or about to occur when the brake pedal 72 of the leading vehicle 12 is pressed (e.g., by a foot of the user of the leading vehicle 12).

If the brake pedal 72 of the leading vehicle 12 is pressed, the leading vehicle 12 may communicate the braking assistance request signal 82 to the trailing vehicle 14 at block 112. In response to receiving the braking assistance request signal 82, the trailing vehicle 14 may compare the deceleration requirements of the leading vehicle 12 with the deceleration requirements of the trailing vehicle 14 at block 114. This comparison may be performed by the control module 42B of the trailing vehicle 14 and may include calculating the required braking compensation (e.g., in the form of assistive braking output torque from the braking system 70) necessary for achieving a target deceleration rate indicated by the leading vehicle 12.

At block 116, the braking command signal 84 may be transmitted to the braking system 70 of the trailing vehicle 14 for providing the assistive braking torque output during the towing event. The method 100 next determines whether the deceleration requirement thresholds of the coupled vehicles are met at block 118. If NO, the method 100 may proceed to block 120 by either increasing or decreasing the braking torque output of the trailing vehicle 14 (e.g., by controlling the braking system 70). If YES, the method 100 may determine whether the ignition of the leading vehicle 12 is turned off at block 122. The method 100 may end at bock 124 if the ignition is turned off.

The vehicle-to-vehicle (V2V) in-flight energy transfer systems of this disclosure are designed to provide bidirectional charging while the participating vehicles are making forward progress toward their respective destinations. The systems are further configured to provide braking assistance to the leading/towing vehicle during the towing event. The braking assistance can help reduce the burden of braking loads experienced by the leading/towing vehicle during towing events.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments, thereby decreasing brake wear and jerking when braking.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a drive wheel;
   a braking system adapted for decelerating the drive wheel; and
   a control module programmed to control the braking system for applying a braking torque output for decelerating the drive wheel in response to receiving a braking assistance request signal during a towing event,
   wherein the control module is further programmed to calculate the braking torque output necessary for achieving a target deceleration rate indicated by the braking assistance request signal and communicate a braking command signal to the braking system for commanding the braking system to apply the braking torque output,
   wherein the braking assistance request signal includes braking-related data that includes at least a travel distance of a brake pedal of the braking system, and further wherein the braking torque output is configured to mimic a deceleration rate of a second electrified vehicle that is coupled to the electrified vehicle during the towing event.

2. The electrified vehicle as recited in claim 1, wherein the braking assistance request signal is received from the second electrified vehicle, and comprising a telecommunications module configured for establishing bidirectional communications between the electrified vehicle and the second electrified vehicle.

3. The electrified vehicle as recited in claim 1, wherein the control module is a component of the electrified vehicle being towed during the towing event.

4. The electrified vehicle as recited in claim 1, wherein the braking assistance request signal includes braking-related information received from the second electrified vehicle that is coupled to the electrified vehicle during the towing event.

5. The electrified vehicle as recited in claim 1, comprising a bidirectional power transfer system configured to enable the bidirectional transfer of power between a first traction battery pack of the electrified vehicle and a second traction battery pack of the second electrified vehicle.

6. The electrified vehicle as recited in claim 1, wherein the control module is further programmed to command the braking system to provide a maximum braking torque output until a stability event of the second electrified vehicle subsides.

7. The electrified vehicle as recited in claim 1, wherein the braking system is an electronic brake booster (EBB) system that includes a brake pedal, an electric actuator, a braking device, and an electronic control unit that are operably coupled to one another for applying the braking torque output.

8. The electrified vehicle as recited in claim 1, wherein the braking-related data includes a pressure applied to the brake pedal and a wheel speed or vehicle speed of the second electrified vehicle.

9. The electrified vehicle as recited in claim 1, wherein the control module is programmed to command that manual braking controls of the electrified vehicle be disabled during the towing event.

10. The electrified vehicle as recited in claim 1, wherein the braking torque output is configured to compensate for a brake fade condition of the second electrified vehicle.

11. The electrified vehicle as recited in claim 1, wherein the braking torque output is configured to compensate for a vehicle stability condition of the second electrified vehicle.

* * * * *